Dec. 12, 1950     W. A. MUNSON     2,533,499
ACOUSTIC RANGE FINDER
Filed Aug. 30, 1944     2 Sheets-Sheet 1

INVENTOR
W. A. MUNSON
BY W. C. Parnell
ATTORNEY

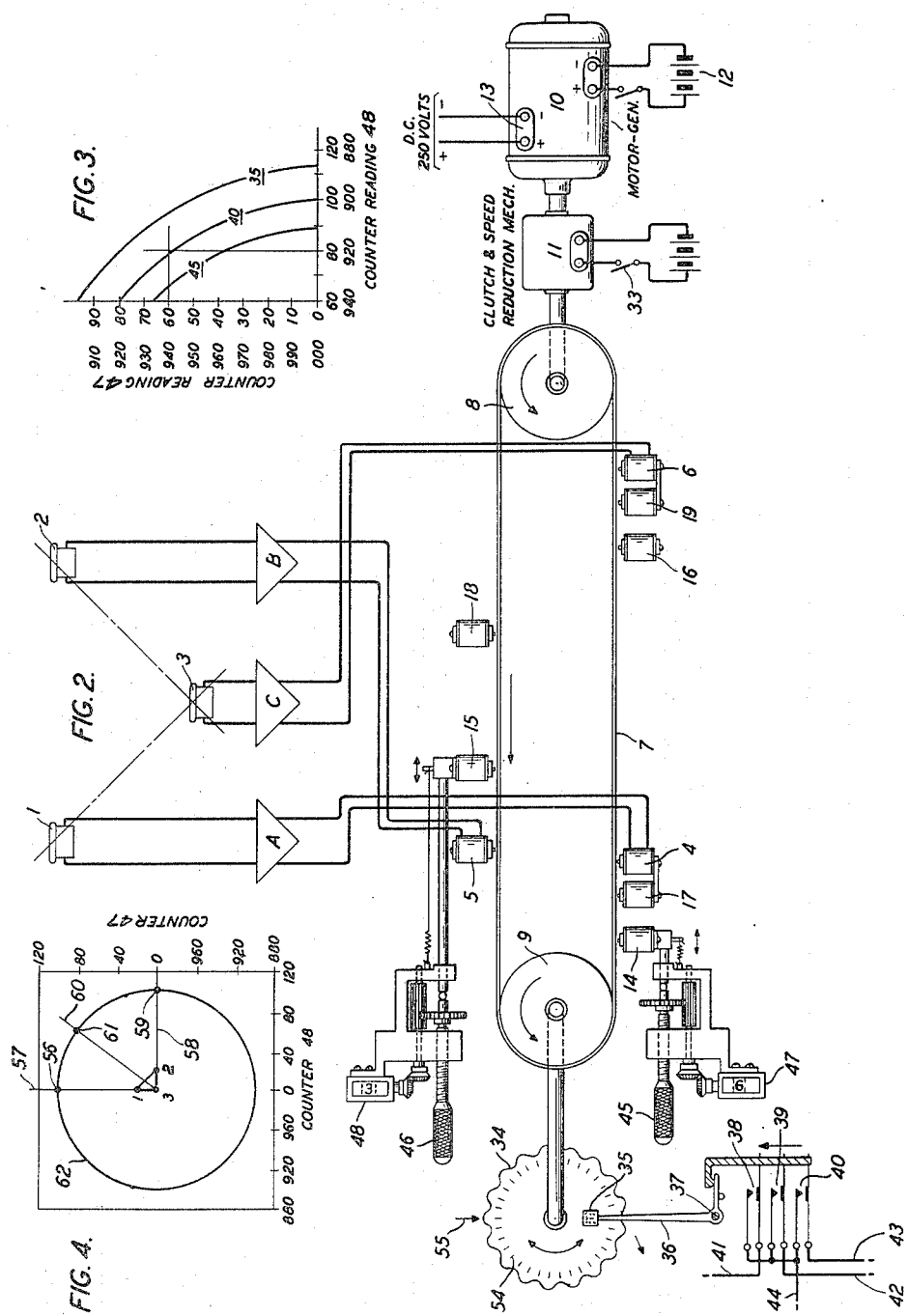

Patented Dec. 12, 1950

2,533,499

UNITED STATES PATENT OFFICE 2,533,499

ACOUSTIC RANGE FINDER

Wilden A. Munson, Chatham, N. J., assignor to Bell Telephone Laboratories, Incorporated, New York, N. Y., a corporation of New York Application August 30, 1944, Serial No. 551,831

3 Claims. (Cl. 181—26)

This invention relates to acoustic range finders of the general type disclosed in my copending joint application with J. C. Steinberg, Serial No. 509,710, filed November 10, 1943, now Patent No. 2,418,136, issued April 1, 1947, in which a sound source, such as an enemy gun, is located by means of bearing lines each of which is determined from differences in the arrival times of the sound at a plurality of pick-up points spaced about a pick-up position.

The object of this invention is an improved range finder of this type which is adapted to be made up in relatively small units which are readily portable and convenient to use.

According to this invention the pick-up from all the microphones at each pick-up point is recorded on a single loop type of magnetic recorder and this recorder together with the necessary reproducing and arrival time difference measuring apparatus forms one compact, mechanically independent unit of the range finder. Each such unit is located close to the corresponding pick-up point, the necessary electrical coordination between the several units being obtained by interconnecting telephone lines.

As in the range finder of the copending application referred to above, the outputs of the microphones are continuously recorded and erased until the sound of interest is heard at which time the recorder is stopped to preserve the several recordings of the sound. In the present invention, however, the several recordings are in different portions of the same tape or wire and they are reproduced simultaneously in pairs to actuate an oscilloscope. These simultaneous reproductions form Lissajous figures from which the arrival time differences may be determined by measuring the displacement of one of the reproducing magnets required to cause the Lissajous figure to assume a given form, such as a straight line.

In the prior range finder the record members were power driven during reproduction and the reproduction was confined to the portions of the recordings containing the sound of interest by the use of commutators. According to an important feature of this invention the extraneous noise is eliminated during reproduction without the use of commutators thereby both avoiding the difficulties commonly encountered in using commutator contacts and at the same time simplifying the apparatus and reducing its weight.

Suitable means, such as a handwheel, is provided for moving the tape until the signal is seen on the oscilloscope. The wheel is then oscillated about this point to give successive reproductions while the arrival time difference is being measured and this operation is further facilitated by blanking out the return traces by means of a circuit disabling switch operated by the reverse motion of the handwheel.

The accuracy with which the sound source is located is, of course, impaired by any phase distortion produced in the recording and reproducing amplifiers and the effect of any such distortion is further increased if the same amplifier is used for both recording and reproducing the output of any given microphone. According to a further feature of this invention the effect on the final measurements of any distortion in the amplifiers is eliminated automatically by means of amplifier switching circuits operated in the course of the recording and reproducing operations. These circuits are such that in reproducing any selected pair of recordings use is made of the same pair of amplifiers as were used in making these recordings but the amplifiers are interchanged so that each recording is made with one amplifier of the pair and reproduced with the other. In this way the phase distortion produced by both amplifiers is present in both reproductions and is therefore balanced out in measuring the time difference between them.

These and other features of the invention including novel methods of ranging will be clearly understood from the following detailed description and the accompanying drawing in which:

Fig. 2 is a diagrammatic view of the apparatus necessary for operating the invention;

Fig. 3 is a speed factor chart which is useful in operating the apparatus; and

Fig. 4 is a diagram for explaining the construction of the chart of Fig. 3.

Figure 1:
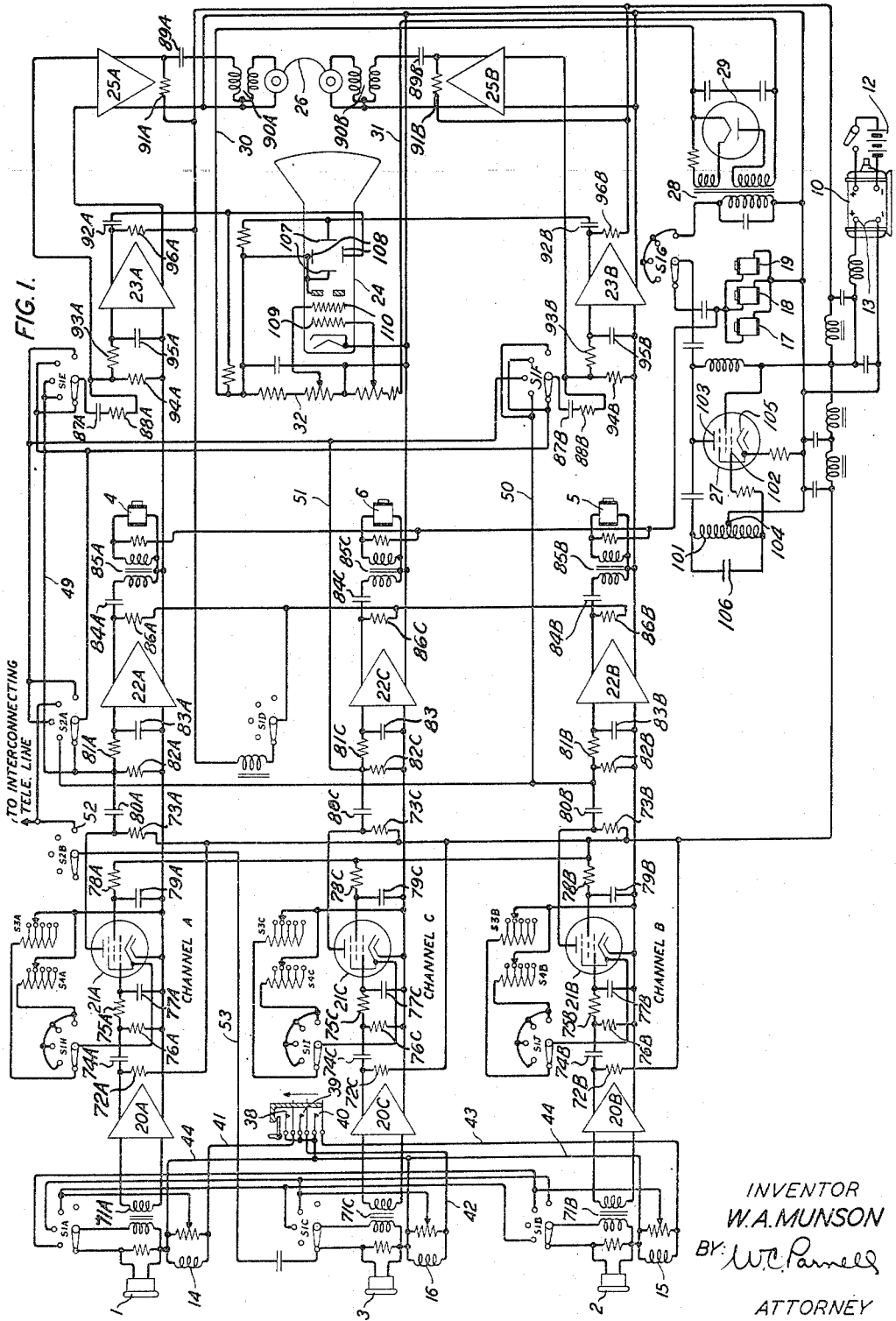
Fig. 1 shows the recording and reproducing circuits of one unit of the range finder.

In the drawing, the microphones 1 and 2 are accurately spaced equidistantly from the microphone 3 along lines forming a right angle facing in the general direction of the sound source to be located as shown in Fig. 2. During the recording operation the microphones are connected to the recording magnets 4, 5 and 6 by means of recording channels indicated generally in Fig. 2 as A, B and C and in more detail in Fig. 1 to be described.

The recording magnets cooperate with a loop record member, such as a tape 7 mounted on drums 8 and 9 and driven by a motor generator unit 10 through a suitable clutch and speed reduction mechanism 11. Since the apparatus is intended for portable use the unit 10 is driven by a storage battery 12 and is provided with generator windings to give a high voltage source 13 of direct current suitable for the plate circuits of the vacuum tubes. The reproducing magnets 14, 15 and 16 and the erasing magnets 17, 18 and 19 are mechanically associated with the recording magnets as shown in Fig. 2 and electrically connected in the circuit as shown by corresponding numerals in Fig. 1.

The recording channels include conventional amplifiers 20A, 20B and 20C, gain control stages 21A, 21B and 21C and conventional power amplifiers 22A, 22B and 22C. The outputs of the gain control stages are also used to drive both the power amplifiers 23A and 23B for the oscilloscope 24 and the amplifiers 25A and 25B for the headset 26.

A Hartley type vacuum tube oscillator 27, in which the inductance 101 which is connected between the control grid 102 and the plate 103 with its mid-point 104 connected to the cathode 105, is tuned by a condenser 106 in the usual manner, derives plate power from the high voltage output 13 of the motor-generator 10 and provides an output of high frequency such as 10,000 cycles per second which is used either to energize the erasing magnets 17, 18 and 19 and bias the recording magnets 4, 5 and 6 of a system of the type shown in Patent 2,235,132 to Wooldridge, or to supply an alternating input to a transformer 28 according to the position of switch S1G. The high voltage output of the transformer is rectified by the tube 29 and applied over conductors 30 and 31 to the voltage dividing network 32 which in turn provides the very high voltages necessary for the deflecting plates 107, 108 and the accelerating electrodes 109, 110 of the oscilloscope 24. The transformer 28 is also provided with a low voltage output coil for heating the filament of the rectifier tube in the conventional manner as shown.

In Fig. 1 all signal circuit switches are shown in the extreme left or recording position. Many of the switches, although shown in different locations in the drawing, are in practice ganged for convenience in operation. For example, the switches S1A, S1B and S1C are ganged together with all the other S1 switches, namely, S1D to S1J to form a master control S1 for conditioning the circuits for recording or reproducing. Volume controls S3 (A, B and C) are ganged together to change the volume levels in all three channels simultaneously when recording; and a similar function is performed when reproducing by the ganged reproducing controls S4 (A, B and C). These volume controls are selectively connected in the cathode return leads of the gain control tubes 21 (A, B and C) under control of the switch S1 as shown so that the channels may be balanced and adjusted to different gains for recording and reproducing and these adjustments left undisturbed when transferring from one operation to the other. The switches S2A and S2B are also ganged and serve to connect the headphone amplifiers 25A and 25B selectively to any one of the three channels for monitoring purposes during recording or to a telephone line to receive messages from a telephone sub-set associated with another unit of the range finder.

Recording

With the motor-generator 10 operating and all other switches in the recording position as shown, the pick-up of microphones 1, 2 and 3 is continuously recorded by the magnets 4, 5 and 6 respectively on the tape 7 each recording being preserved only until it reaches the next erasing magnet 17, 18 or 19 so that at any given instant the tape will contain a record of the sounds received in the preceding short time interval. The microphones 1, 2 and 3 are connected to their respective magnets 4, 5 and 6 through identical networks indicated in Fig. 1 as channels A, B and C, the elements of which are numbered alike except for the channel designation A, B or C. A description of the recording operation of channel A, which follows, will likewise be applicable to channel B or C.

During the recording operation of channel A, the sound to be recorded is picked up by microphone 1 and pre-amplified by amplifier 20A which is inductively connected to the microphone by transformer 71A. Plate voltage is supplied to the plates of amplifier 20A, gain control tube 21A, and amplifier 22A from a direct current source 13 through plate resistors 72A, 73A and 80A, respectively. Screen grid voltage is also supplied from the same source 13 to the gain control tube 21A through the screen grid resistor 78A. A condenser 79A is shunted across the screen grid resistor 78A to prevent feedback of the alternating current component of the screen grid current.

The amplified sound signal from amplifier 20A is transmitted to gain control tube 21A by means of coupling condenser 74A through an input network comprising control grid resistor 75A and a standard filter arrangement, resistor 76A and condenser 77A. A variable resistor is controlled by switch S3A and is connected in series with the cathode of tube 21A through switch S1H to provide the necessary self-bias voltage for the control grid of the tube. The volume of the sound signal from amplifier 20A may be adjusted by switch S3A by selecting different resistor stages in the switch. The adjusted sound signal is transmitted from gain control tube 21A to amplifier 22A by means of coupling condenser 80A through an input network comprising control grid resistor 81A and a filter consisting of resistor 82A and condenser 83A.

The amplified sound signal from amplifier 22A is transmitted by means of coupling condenser 84A to transformer 85A which is inductively coupled to recorder 4. The sound signal is then recorded by recorder 4 on tape 7.

In the drawing, as shown in Fig. 1, switch S2A connects the monitoring and oscilloscope amplifiers 23A, 23B and 25A, 25B to channel A for monitoring purposes during recording. Switch S2A serves to connect the headset and oscilloscope amplifiers to any one of the three channels during recording operations. The monitoring and oscilloscope amplifiers 23A and 25A are connected in parallel to switch S1E. In the same way, amplifiers 23B and 25B are connected to switch S1F. With switch S1 in its first, or recording, position, the amplifiers 23A, 25A, 23B and 25B are connected to the movable monitoring switch S2A which is coupled to gain control tube 21A by condenser 80A. The oscilloscope and headset amplifiers 23A and 25A are connected in parallel to switch S1E through a coupling network comprising condenser 87A, resistor 88A which serves to eliminate high frequency sound waves from the oscilloscope 24 and the headset 26. The input network to the oscilloscope amplifier 23A consists of a filter arrangement, condenser 95A, resistor 94A and control grid resistor 93A, connected to switch S1E through the filter 87A, 88A. A similar filter and input network, as described above, connect the oscilloscope and headset amplifiers 23B and 25B to switch S1F. Plate voltage is supplied to the monitoring and oscilloscope amplifiers 23A, 23B and 25A, 25B through plate resistors 96A, 96B and 91A, 91B, respectively. Headset 26 is inductively coupled to transformers 90A and 90B which are connected to amplifiers 25A and 25B by coupling condensers 89A and 89B, respectively. Oscilloscope 24 is coupled to the amplifiers 23A and 23B by coupling condensers 92A and 92B which are connected to the plates 197, 198 of the oscilloscope. The sound signal during recording operation, therefore, may be observed on the oscilloscope 24 or monitored by the headset 26.

When the sound of interest is heard, recording is stopped immediately to preserve the record of this sound as made by all three channels. This may be effected by closing a switch 33 to energize within the housing 11, a clutch magnet which disconnects the drum 8 from the drive and stops the motion of the tape. In practice it is found sufficient to provide a storage time of only two seconds for each channel and this is conveniently obtained with a total tape length of only four feet and a tape speed of six to seven inches per second. In practice the switch 33 could be used also to energize over an interconnecting telephone line the clutch magnets of all other recording units forming part of the range finding system.

Reproducing

The main control switch $S_1$ is then rotated clockwise from the recording position in which it is shown to the proper position to select the desired pair of recordings for reproduction. For example, if the recordings made by magnets 4 and 5 from the pick-up of microphones 1 and 2 are to be reproduced, the switch is moved to the second position. In this position the reproducing magnet 14 is connected through switches $S_1A$ and $S_1B$ to channel B and the reproducing magnet 15 is connected through the same switches to channel A thereby interchanging the amplifiers to balance out the amplifier distortion as explained above.

Since the tape moves at low speed it comes to rest almost immediately when the clutch is disengaged and the operator very soon learns about how far back the tape must be moved to reproduce the desired signal. The handwheel 34 is rotated clockwise by the estimated amount and then moved back and forth through a small angle while watching the screen of the oscilloscope tube 24. On the backward motion of the tape the friction of the pad 35 on the handwheel rotates the arm 36 about the pivot 37 thereby closing the contacts 38, 39 and 40 and connecting conductors 41, 42 and 43 to conductor 44. This short-circuits the reproducing magnets 14, 15 and 16 and prevents any reproduction during reverse tape motion. If the signal is not found the tape is moved further back and the back and forth motion of the handwheel is repeated until the desired signal appears.

In the case of any ambiguity as to the identity of a particular signal which is reproduced, the main control switch $S_1$ may be set to the forth or monitoring position in which case each reproducing magnet is connected to its associated amplifier channel at the monitoring contacts of switches $S_1A$, $S_1B$, and $S_1C$ and the monitoring and oscilloscope amplifiers 23A and B and 25A and B are connected in parallel to the arm of the monitoring switch $S_2A$ by the switches $S_1E$ and $S_1F$. With the monitoring switch on channel A as shown all three recorded signals may be reproduced over channel A and observed in succession by means of the headset 26 or the oscilloscope or both if desired.

In Fig. 2 it will be noted that the spacing between the erasing magnet 18 and the recording magnet 5 is much greater than the corresponding spacing of the magnets 17 and 19 with respect to the recording magnets 4 and 6. In the recording operation all signals and noise are erased from the portions of the tape which at any given time are located between an erasing magnet and the next recording magnet. Due to the location of the magnet 18 the silent interval after the reproduction of the channel B signal will be much longer than the other silent intervals and hence it may be used as a reference for identifying any of the signals.

Since, as stated above, all the $S_1$ switches are ganged the opertion of the switch to reproduce any pair of recordings such for example as those made by microphones 1 and 2, will also perform all the other switching operations required for reproduction. At switches $S_1H$, $S_1I$ and $S_1J$ the reproducing volume controls $S_4$ (A, B and C) are substituted for the recording controls $S_3$ (A, B and C) to adjust the gain to the proper value for reproduction. The plate supply for the amplifiers 22 (A, B and C), which are not required for reproduction, is cut off by switch $S_1D$, the A monitoring and oscilloscope amplifiers are connected to channel A and the corresponding B amplifiers to channel B by switches $S_1E$ and $S_1F$ over conductors 49 and 50 and plate power is supplied to the oscilloscope by switch $S_1G$.

As the handwheel 34 is moved back and forth to give successive reproductions of the selected pair of recordings, the oscilloscope usually will show first a cross pattern indicating a time difference in the two reproductions. One of the pole-pieces 14 or 15 is then moved along the tape by means of the micrometer adjusting screw 45 or 46 until the pattern becomes a straight line indicating that the two reproductions are exactly simultaneous. Alternatively the condition of simultaneous reproduction of the two recordings may be indicated by adjusting the pole piece until the two receivers of the headset 26 are in binaural balance or if desired this aural technique may be used as a check on the operation of the oscilloscope. When this condition has been obtained the readings of the associated counters 47 and 48 provide a measure of the difference in the arrival times of the signal at the microphones 1 and 2.

This procedure may then be repeated to measure the difference in the arrival times at microphones 1 and 3 by moving the control switch $S_1$ to the third position, operating the handwheel as before and in this case adjusting the micrometer screw 45 as required to give simultaneous reproductions. Under this circuit condition switch $S_1A$ and $S_1C$ connect the reproducing pole-pieces 14 and 16 to channels C and A, respectively, to balance out distortion and switch $S_1F$ switches the amplifiers 23B and 25B from the B to the C channel over conductor 51.

The control switch $S_1$ may then be moved to its fifth position to connect the magnets 15 and 16 to the oscilloscope over channels C and B, respectively in which case the amplifiers 23A and 25A are disconnected from the A channel and reconnected to the C channel over conductor 51, thereby interchanging the channel connections used in making this pair of records. The micrometer screw 45 is then readjusted to give simultaneous reproductions of the recordings made by microphones 2 and 3 and the counter readings are noted as before.

The operator then has three sets of counter readings representing the relative arrival times of the sound at each of the three microphones and from these readings he is able in a known manner to determine the direction of the sound source from this particular pick-up position. One or more similar units disposed at other pick-up points give similar direction lines from those points to the source and knowing the relative locations of the pick-up points the source is readily located by well-known graphical methods.

In cases where it is inconvenient or impracticable to place the several units of the system at known points or to locate them with respect to each other by ordinary measurements, the units may be used to locate themselves by firing shots from each unit location and recording the sounds at each of the other unit locations. The method of locating the bearing of one unit position with respect to the other will be obvious from the above description since it is the same as for locating a hostile gun.

In order to determine the distance from one unit to the other the control switch S1 is set to recording position and the monitoring switch S2 (A and B) is moved to its fifth or survey position. A shot is then fired from the position of the other unit and the first unit tape is stopped when the shot is heard. The sound of the shot will be picked up by the telephone transmitter at the other unit and transmitted over the interconnecting line to terminal 52 of switch S2B and over conductor 53 to the input of the C channel to be recorded on the tape by the magnet 6. A short time later the sound of the shot transmitted through the air is picked up by microphones 1, 2 and 3 and recorded by all three magnets 4, 5 and 6.

With the control switch S1 set to monitor (position 4) and the monitor switch S2A set to monitor on channel C the tape is scanned to find the record of the shot as recorded over the telephone line and the position of the handwheel 34 for reproducing this record is noted by reading the scale 54 with respect to the index 55. The tape is then scanned again to find and reproduce the C channel recording of the shot as picked up by microphone 3 and again record is made of the handwheel position. These readings may be, for example, 1.55 on the telephone signal and 9.00 on the microphone signal. For any given velocity of sound propagation and tape speed the difference in these two handwheel readings, in this case 7.45, is directly proportional to the distance to the other unit where the shot was fired. However, since neither the velocity of sound or the recording speed can be assumed to be known, the difference in readings must be multiplied by a factor corresponding to the atmospheric conditions and tape speed at the time the measurements were made in order to determine the actual distance with the required degree of accuracy.

This factor is obtained by making counter measurements, in the manner already described, of the arrival time differences between the recordings of the sound of the shot as transmitted by air and using these counter readings in conjunction with the chart of Fig. 3. In this chart the scales are calibrated in terms of the counter readings and the numbers such as 45, 40 and 35 on the typical circle segments shown are the factors to be used in determining the distance to be measured in yards.

The construction and use of the chart will be more easily understood by first considering Fig. 4 in which the scales are calibrated in terms of counter readings and the microphone array is represented by the points 1, 2 and 3. For a sound wave approaching the microphone 3 from some distant point on the line defined by the microphones 3 and 1 the wave will arrive first at microphone 1 and then some time later it will arrive simultaneously at microphones 2 and 3. With a given velocity of sound propagation and tape speed the difference in the arrival times at microphones 1 and 3 will give some definite reading such as 100 on counter 47 and since there is no difference in arrival time at microphones 2 and 3 counter 48 will read zero. These two readings are the coordinates of point 56 on the line 57 to the sound source. Similarly, a wave approaching the array from a source on the line 58 gives a reading of zero on counter 47 and a reading of 100 on counter 48 thereby defining point 59.

A wave approaching from some intermediate direction such for example as along the line 60 will give readings of 80 and 60 respectively thereby defining point 61 on the chart and waves from any other direction will give other similar points all of which will lie on the circle 62 as long as the velocity of sound and tape speed are constant. For any other set of values of sound velocity and tape speed all of these points will lie on other circles of greater or lesser diameters depending on whether the variations in sound velocity and tape speed result in greater or lesser spacings in the tape between the successive recordings of the sound.

It will therefore be seen that any particular circle so defined corresponds to a particular operating condition and may therefore be designated by a number representing the proper factor by which the number representing the difference in handwheel readings referred to above must be multiplied in order to obtain an accurate measure of the distance to the sound source for the particular conditions under which the handwheel readings were obtained.

In the chart of Fig. 3 each curve shown is therefore a segment of the circle representing the locus of the point defined by successive pairs of counter readings obtained by measurements on a sound source approaching the pickup point at different angles of incidence. While only three such segments are shown, as many other intermediate segments as required may be provided and by calibrating both horizontal and vertical scales in terms of both counter readings only small segments of the circles are required to obtain the factor corresponding to any combination of counter readings.

To obtain the counter readings which determine the factor to be used the control switch S1 is first set to its third position to reproduce the recordings of the shot made by microphones 1 and 3 and the arrival time difference is measured by adjusting the screw 45 to obtain a reading on counter 47. The switch is then moved to its fifth position and a corresponding reading is obtained on counter 48 for the arrival time difference between the recordings made by microphones 2 and 3.

If for example, these counter readings are 060 and 080, respectively, it is found by reference to Fig. 3 that these readings are the coordinates of a point on the speed factor curve 40. The distance between the pick-up point and the other unit at which the shot was fired is therefore $7.45 \times 40 = 298$ yards.

This surveying procedure may then be repeated with respect to other units of the range finder until all required distances have been determined after which the system is in condition for ranging on hostile guns or any other sound source in the manner already described.

What is claimed is:

1. In a sound ranging system, a plurality of microphones in spaced relation with respect to a source of sound to be located, a magnetic recording member, a power drive for the member, a plurality of translating magnets spaced along the member for making and reproducing a plurality of recordings of the same sound as picked up by the several microphones, means for moving the member back and forth with respect to said magnets to cause repeated reproduction of corresponding portions of said recordings, means effective during the backward motion of said member for disabling the reproducing channels, means for displacing one of the magnets along the member to effect reproduction simultaneously with the reproduction of the corresponding portion of another recording, means for comparing the reproductions and means for registering the magnet displacement required to produce the simultaneous reproduction whereby the difference in arrival times and hence the location of the sound may be determined.

2. In an acoustic ranging system for determining the location of enemy guns from the sound of their fire, a base line, and a sound recording and reproducing means at each extremity of said base line, means for establishing the factors of the length of said base line comprising at one extremity of said base line means for producing a test sound at the other extremity of said base line one of said sound recording and reproducing means which comprises a group of spatially related microphones, a magnetic recording member, a power drive for said member, a plurality of translating magnets spaced along said member for making and reproducing a plurality of recordings of the test sound produced by said sound producing means as picked up by said microphones, means for moving said member back and forth with respect to said magnets to cause repeated reproduction of corresponding portions of said recordings, means effective during the backward motion of said member for disabling the reproducing channels, means for displacing one of said magnets along the member to effect reproduction simultaneously with the reproduction of the corresponding portion of another recording, means for comparing the reproductions and means for registering the magnet displacement required to produce the simultaneous reproduction whereby the difference in arrival times of said test sound as received by each of said microphones and hence one of said factors may be determined, said factor being a value established by a point defined by coordinates representing the difference in arrival times of said test sound as received by each of said microphones, said point serving to select one of a predetermined series of circles each of which corresponds to a particular combination of sound velocity and recording member velocity, each of said circles being defined by points the coordinates of each of which represent the difference in arrival times of a sound as received by each of said microphones at a particular angle of incidence, a transmitter at the extremity of said base line where said test sound is produced, a telephone line electrically connecting said transmitter to one of said translating magnets for transmitting said test sound telephonically to said translating magnet and recording said sound on said recording member, and means for measuring the difference in arrival times of said test sound as received acoustically and telephonically at said translating magnet and recorded on said recording member, said difference in arrival times being the other of said factors establishing said base line, means for determining the bearing of the sound of enemy gun-fire with respect to said established base line, said determining means including said sound recording and reproducing means at each extremity of said base line, each of said sound recording and reproducing means comprising said group of spatially related microphones, said magnetic recording member, said power drive for said member, and said plurality of translating magnets spaced along said member for making and reproducing a plurality of recordings of said sound of enemy gun-fire as picked up by said microphones, and means for displacing one of said magnets along the member to synchronize the reproduction of one recording with a corresponding portion of another recording of said sound, the extent of said displacement being a measure of the difference in arrival times of said sound of enemy gun-fire as received by each of said microphones, from which may be determined, at each group of microphones, the bearing of said sound of enemy gun-fire with respect to said established base line.

3. Apparatus for establishing the factors of the length of the base line in an acoustic ranging system including a base line and means at each extremity of said base line for recording and reproducing sound, which comprises, at one extremity of said base line means for producing a test sound, at the other extremity of said base line a plurality of microphones in spaced relation with respect to the source of said test sound, a magnetic recording member, a power drive for said member, a plurality of translating magnets spaced along said member for making and reproducing a plurality of recordings of the test sound produced by said means as picked up by said microphones, means for moving said member back and forth with respect to said magnets to cause repeated reproduction of corresponding portions of said recordings, means effective during the backward motion of said member for disabling the reproducing channels, means for displacing one of said magnets along the member to effect reproduction simultaneously with the reproduction of the corresponding portion of another recording, means for comparing the reproductions and means for registering the magnet displacement required to produce the simultaneous reproduction whereby the difference in arrival times of said test sound as received by each of said microphones and hence one of said factors may be determined, said factor being a value established by a point defined by coordinates representing the difference in arrival times of said test sound as received by each of said microphones, said point serving to select one of a predetermined series of circles each of which corresponds to a particular combination of sound velocity and recording member velocity, each of said circles being defined by points the coordinates of each of which represent the difference in arrival times of a sound as received by each of said microphones at a particular angle of incidence, a transmitter at the extremity of said base line where said test sound is produced, a telephone line electrically connecting said transmitter to one of said translating magnets for transmitting said test sound telephonically to said translating magnet and recording said sound on said recording member, and means for measuring the difference in arrival times of said test sound as received acoustically and telephonically at said translating magnet and recorded on said recording member, said difference in arrival times being the other of said factors

WILDEN A. MUNSON.

REFERENCES CITED

The following references are of record in the file of this patent:

UNITED STATES PATENTS

| Number | Name | Date |
|---|---|---|
| 684,706 | Mundy | Oct. 15, 1901 |
| 913,528 | Marriott | Feb. 23, 1909 |
| 1,843,725 | Karcher | Feb. 2, 1932 |
| 2,006,455 | Hickman | July 2, 1935 |
| 2,243,730 | Ellis | May 27, 1941 |
| 2,247,847 | Pfleumer | July 1, 1941 |
| 2,284,306 | Sparling | May 26, 1942 |
| 2,299,620 | Giannini | Oct. 20, 1942 |
| 2,351,005 | Camras | June 13, 1944 |
| 2,354,739 | Clausen | Aug. 1, 1944 |
| 2,356,478 | Stryker | Aug. 22, 1944 |
| 2,378,383 | Arndt | June 19, 1945 |
| 2,394,990 | Eisler | Feb. 19, 1946 |
| 2,395,481 | Hoover | Feb. 26, 1946 |
| 2,418,136 | Munson et al. | Apr. 1, 1947 |
| 2,427,421 | Rieber | Sept. 16, 1947 |